United States Patent

Gordon

[15] 3,654,394

[45] Apr. 4, 1972

[54] FIELD EFFECT TRANSISTOR SWITCH, PARTICULARLY FOR MULTIPLEXING

[72] Inventor: Bernard M. Gordon, Magnolia, Mass.

[73] Assignee: Gordon Engineering Company, Wakefield, Mass.

[22] Filed: July 8, 1969

[21] Appl. No.: 839,937

[52] U.S. Cl. ....................179/15 BL, 307/251, 307/304

[51] Int. Cl. ....................H03k 17/62, H04j 3/00

[58] Field of Search ....................179/15 BL, 15 A; 307/251, 253, 307/254, 304, 293, 249; 340/183

[56] References Cited

UNITED STATES PATENTS

| | | | |
|---|---|---|---|
| 3,535,458 | 10/1970 | Gottfried | 179/15 LL |
| 3,535,450 | 10/1970 | Vollmeyer | 178/50 |
| 3,515,905 | 6/1970 | Raper | 307/249 |
| 3,518,454 | 6/1970 | French | 307/251 |
| 3,517,178 | 6/1970 | Herndon | 307/304 |
| 3,448,293 | 6/1969 | Russell | 307/251 |
| 3,386,053 | 5/1968 | Priddy | 307/255 |
| 3,378,779 | 4/1968 | Priddy | 307/255 |
| 3,089,091 | 5/1963 | Lindenthal | 179/15 |

OTHER PUBLICATIONS

Electronic Design 26 Nov. 22, 1966 50- 54.
Electronics Dec. 28, 1964 45- 61 Shipley, Gulbenk, Prosser Coppen, Hughes, Giroux, Olesen.
Crystalonics Inc. Application Notes Nov. 65

*Primary Examiner*—Kathleen H. Claffy
*Assistant Examiner*—Tom D'Amico
*Attorney*—Morse, Altman & Oates

[57] ABSTRACT

In a device for multiplexing plural analog signals, a high impedance switch, wherein the conduction state of a first field effect transistor is controlled by a second field effect transistor, is provided for expeditious switching of an input signal and minimal loading of an input source.

11 Claims, 3 Drawing Figures

INVENTOR
BERNARD M. GORDON
BY Morse, Altman & Oates
ATTORNEYS

INVENTOR
BERNARD M. GORDON
BY Morse, Altman & Oates
ATTORNEYS

FIELD EFFECT TRANSISTOR SWITCH, PARTICULARLY FOR MULTIPLEXING

BACKGROUND AND SUMMARY

The present invention relates to multiplexing devices and particularly to multiplexers employing high impedance switching devices. In a multiplexer, a plurality of switching devices are provided for switching a plurality of input signals in a programmed sequence, whereby the input signals are presented individually at a common output terminal. Such systems have suffered from switching errors, which have been caused by input source loading, and from inefficiency, which has been caused by low speed switching devices.

A primary objective of the present invention is to provide, particularly for multiplexers, a switching device characterized by a first field effect transistor for switching an input signal, a second field effect transistor for controlling the conduction state of the first field effect transistor, and a driver circuit for controlling the conduction state of the second field effect transistor. The combination of the first field effect transistor, the second field effect transistor and driver circuit is such as to provide a high impedance to a driving source and expeditious switching of the input signal, whereby switching errors are avoided and switching efficiency is increased.

The invention accordingly comprises the apparatus possessing the construction, combination of elements, and arrangement of parts that are exemplified in the foregoing detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein.

DETAILED DESCRIPTION

Figure 1:
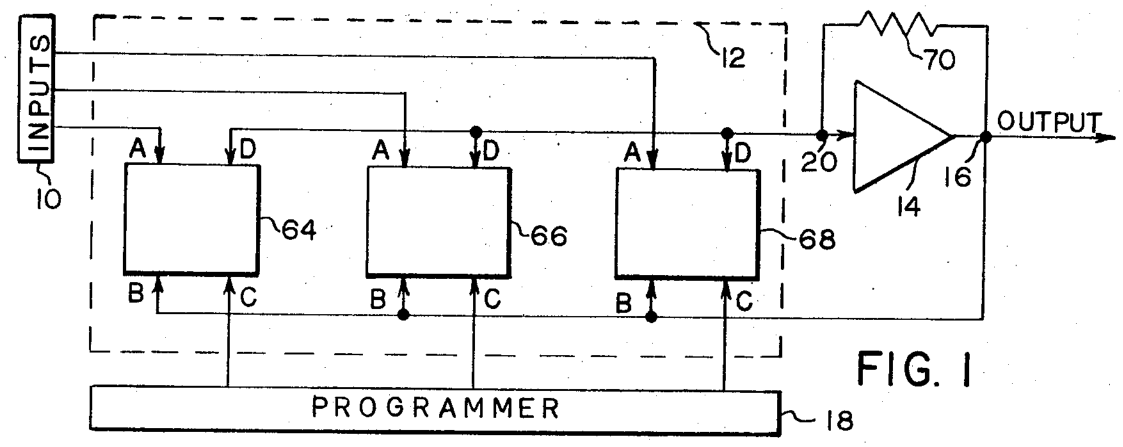
FIG. 1 is a schematic and block diagram of a one level multiplexer embodying the present invention.

Generally, the multiplexer of FIG. 1 comprises an input terminal 10 for receiving a plurality of input signals, a switching network 12, including a plurality of like switching devices, wherein each input signal is applied to its correlative switching device, an operational amplifier 14 for presenting each input signal at a common output terminal 16, and a programmer 18 for generating a plurality of program signals for controlling the state of each of the switching devices. Each of the switching devices has an input A, a feedback input B, a selection input C and an output D. The output D of each of the switching devices is connected to a common input 20 of operational amplifier 14. A schematic diagram of a typical switching device is shown in FIG. 3, as will be explained hereinafter.

Figure 2:
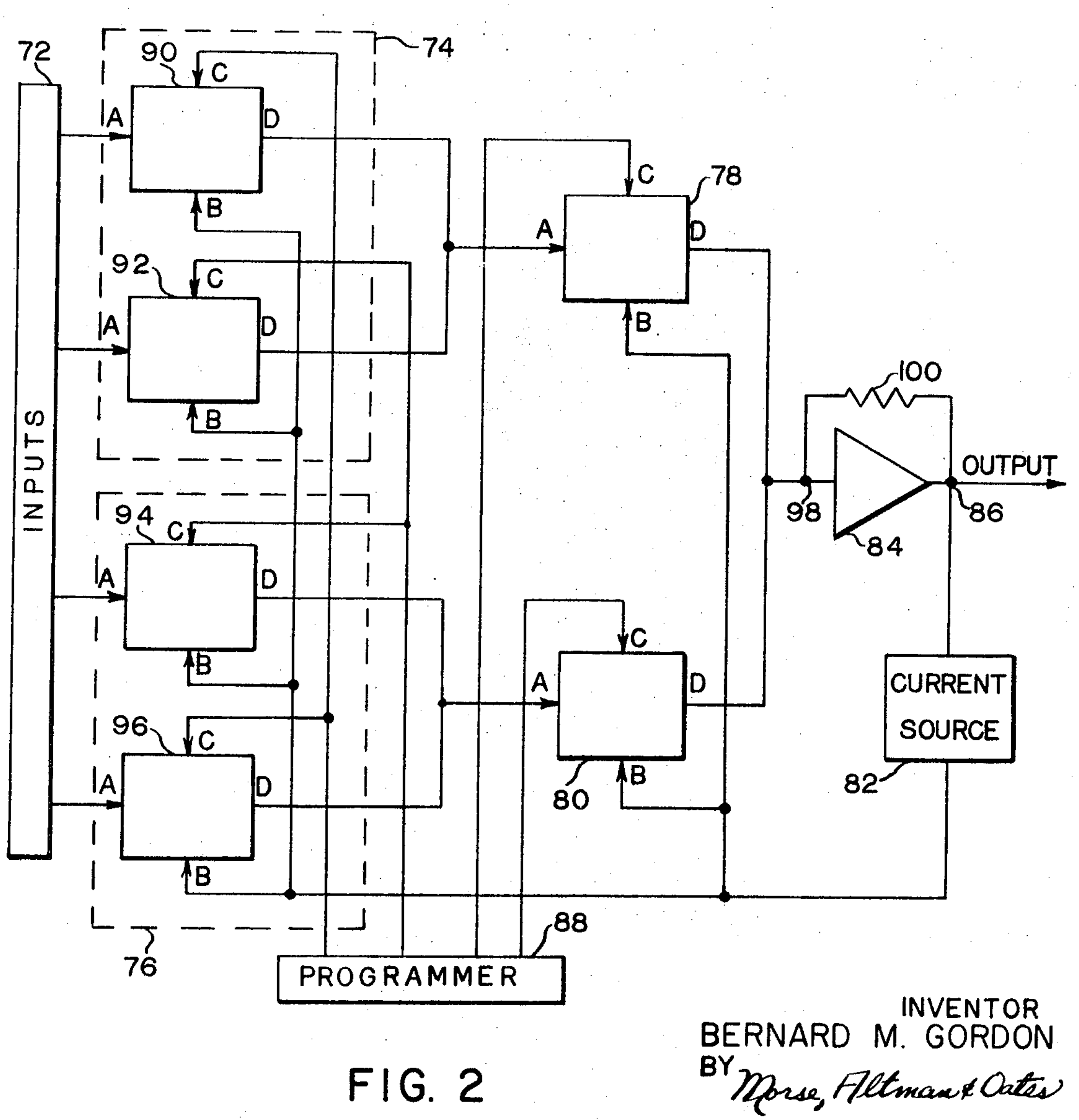
FIG. 2 is a schematic block diagram of a two level multiplexer embodying the present invention.
Figure 3:
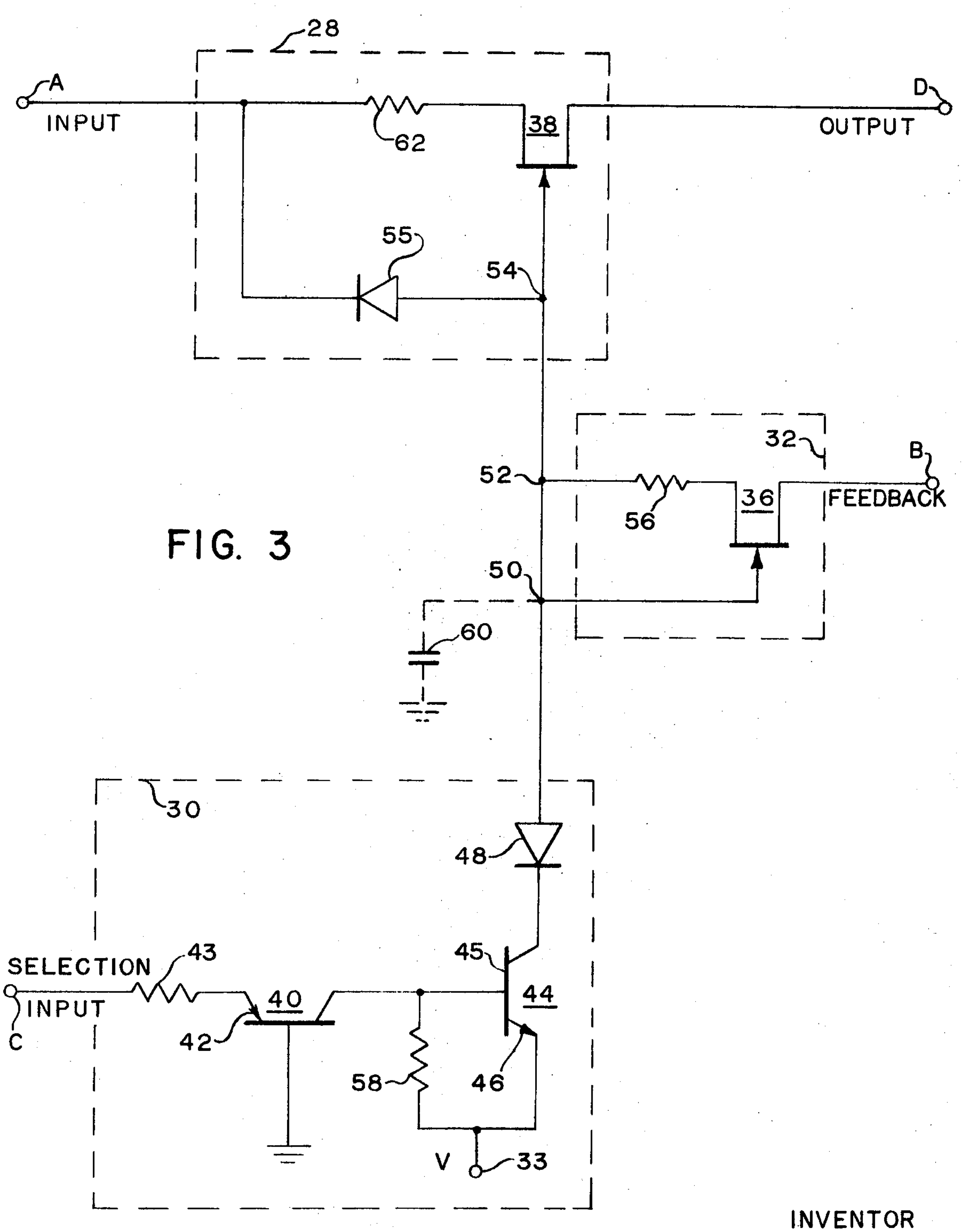
FIG. 3 is a schematic diagram of a high impedance switch particularly applicable to the multiplexers of FIG. 1 and FIG. 2.

A typical switching device of the type shown in FIGS. 1 and 2 is shown in FIG. 3. Generally, this switching device comprises a switch 28 for switching an input signal, a driver 30 for controlling the state of switch 28, and a current source 32 for controlling the switching time of switch 28. Switch 28 includes a field effect transistor 38 having its drain connected to an output D, a resistor 62 connected serially between an input A and the source of field effect transistor 38, and a diode 55 connected serially between the input A and the gate of the field effect transistor. Driver 30 includes a transistor 40 having its base at ground potential, a resistor 43 connected serially between a selection input C and the emitter of transistor 40, a transistor 44 having its base connected to the collector of transistor 40 and its emitter to a terminal 33, a resistor 58 connected serially between terminal 33 and the base of transistor 44, and a diode 48 having its cathode connected to the collector of transistor 44. Current source 32 includes a field effect transistor 36 having its drain connected to a feedback input B and its gate connected to the anode of diode 48, and a resistor 56 connected serially between the source of field effect transistor 36 and the gate of field effect transistor 38. The ON and OFF state of the switching device is determined by the conduction state of field effect transistor 38 in switch 28, that is, the switching device is in the ON state when field effect transistor 38 is in the conducting state and in the OFF state when field effect transistor 38 is in the non-conducting state. The operation of the switch 28, driver 30, and current source will be described now in connection with specific circuit parameters. In one example, the voltage at input A of switch 28 is minus 10 volts; the voltage V at terminal 33 of driver 30 is minus 15 volts; and the pinch-off voltage for field effect transistor 36 and 38 is 3 volts, i.e., the field effect transistor is in a conducting state when its source to gate potential is 3 volts or less and in a non-conducting state when its source to gate potential is greater than 3 volts.

A positive signal is applied to the input C of driver 30. The positive signal as at the input C is applied to transistor 40 at the emitter 42 through resistor 43 and transistor 40 is in a conducting state. The positive signal is coupled to transistor 44 at the base 45 through the conducting emitter junction of transistor 40. The potential at base 45 is more positive than the potential at the emitter 46 and transistor 44 is in a conducting state. Diode 48 is forward biased and conducting and field effect transistor 36 is in the conducting state. In the illustrated example, the diode cathode is at about minus 15 volts and junction 50, 52, and 54 are at about minus 15 volts and field effect transistor 36 is in the conducting state. Since the voltage as at the input A is minus 10 volts and the voltage as at junction 54 is minus 15 volts, field effect transistor 38 is in the non-conducting state. A feedback signal from an operational amplifier (not shown) is applied to the feedback input B of current source 32 and is coupled through the conducting field effect transistor 36 and resistor 56 to junction 52. A negative signal is applied to emitter 42 and transistor 40 is changed to a non-conducting state. The voltage at the junction of base 45 and resistor 58 is negative and transistor 44 is changed to a non-conducting state. Non-conducting transistor 44 appears as an open circuit and diode 48 stops conducting. The anode of diode 48 is elevated by stray capacitance 60 which is charged by the current through field effect transistor 36. The pinch-off voltage of field effect transistor 36 is exceeded and field effect transistor 36 is changed to the non-conducting state. The source to gate potential of field effect transistor 38 becomes less than 3 volts and field effect transistor 38 changes to the conducting state. The switching device is in the ON state and the signal at input A from a driving source (not shown) is coupled through resistor 62 and field effect transistor 38 to the output D. As shown in FIG. 1, the output D of a switching device is connected to a high impedance operational amplifier 14. The high impedance of the operational amplifier is presented at the input A when the switching device is in the ON state and the high impedance of a field effect transistor is presented at the input A when the switching device is in the OFF state. Therefore, in both the ON and OFF state, a high impedance is presented at the input A of the switching device. Resistor 62 serves as a current buffer and limits the current applied to input A when two or more switching devices of the multiplexer shown in FIG. 1, for example, are in the ON state simultaneously.

In the device of FIG. 1, a plurality of analog signals, for example, are applied to an input terminal 10. The analog signals as at input terminal 10 are applied to a plurality of like switching devices 64, 66, and 68 in such a manner that each of the analog signals is attributed to one of the like switching devices. It will be understood that, in alternative embodiments, the number of switching devices is other than three, for example, eight. The state of each of the switching devices is specified by the program signal which is applied thereto at the input C. When a switching device is designated as being in the ON state, a current, representative of the input analog signal, is permitted to flow from the input A through the switching device to the input D, which is connected to the common input 20 of operational amplifier 14. The current at 20 generates a voltage across a feedback resistor 70 of operational amplifier 14. Hence, the voltage at common output 16 is proportional to the current at common input 20. As previously stated, the current at 20 is representative of the input analog signal applied to the input A of the switching device designated as being in the ON state. Therefore, the voltage as at common output 16 represents the analog signal applied to the input A of the switching device designated as being in the ON state. By sequentially or randomly controlling the ON and OFF state of each switching device 64, 66, and 68, each input analog signal as at input terminal 10 is presented sequentially or randomly at common output 16. The analog signal as at 16 is applied as feedback signal to switching devices 64, 66, and 68.

FIG. 2 illustrates a two level multiplexer. Generally, the multiplexer comprises an input terminal 72 for receiving a plurality of input signals, a first switching network 74 and a second switching network 76, wherein each switching network includes a plurality of like switching devices, a first switching device 78 for switching an output signal from the first switching network 74, a second switching device 80 for switching an output signal from the second switching network, a current source 82 for supplying a feedback signal to the first and second switching networks and the first and second switching devices, an operational amplifier 84 for presenting each input signal at a common output terminal 86, and a programmer 88 for generating a plurality of program signals for controlling the state of switching device 78, switch device 80 and each like switching device in switching networks 74 and 76.

In the device of FIG. 2, a plurality of analog signals, for example, are applied to input terminal 72. The analog signals as at input terminal 72 are applied to the first switching network 74, comprising like switching devices 90 and 92, and the second switching network 76, comprising like switching devices 94 and 96, in such a manner that each of the analog signals is attributed to each of the like switching devices 90, 92, 94, and 96. It will be understood that, in alternative embodiments, the number of like switching devices in each switching network is other than two, for example, eight and the number of switching networks is other than two, for example, four. The state of each like switching device is specified by the program signal which is applied thereto at the input C. When either switching device 90 or 92 is designated as being in the ON state, the analog signal as at the input A of the ON state switching device is applied to the input A of switching device 78. Likewise, when switching either device 94 or 96 is designated as being in the ON state, the analog signal as at the input A of the ON state switching device is applied to the A input of switching device 80. The state of each of the switching devices 78 and 80 is specified by the program signal which is applied thereto at the input C. When either switching device 78 or 80 is designated as being in the ON state, a current, representative of the analog signal as at the input A of the ON state switching device, is permitted to flow through that switching device to the output D, which is connected to a common input 98 of operational amplifier 84. The current as at 98 generates a voltage across a feedback resistor 100 of operational amplifier 14. Hence, the voltage at common output 86 is proportional to the current at common input 98. The current at 98 is representative of the input analog signal applied to the ON state switching device of switching network 74 when switching device 78 is designated as being in the ON state and is representative of the input signal applied to the ON state switching device of switching network 76 when switching device 80 is designated as being in the ON state. Therefore, the signal as at common output 86 is the analog signal which is applied to the ON state switching device of switching network 74 when switching 78 is designated as being in the ON state and is the analog signal which is applied to switching network 76 when switching device 80 is designated as being in the ON state. By sequentially or randomly controlling the ON and OFF state of each switching device 78, 80, 90, 92, 94, and 96, each input analog signal as at input terminal 72 is presented sequentially or randomly at common output 86. It will be understood that, in alternative embodiments, the number of multiplex levels is other than two, for example, four.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A multi-level multiplexing device for switching a plurality of signals, and device comprising:
- a. input means for receiving a plurality of input signals,
- b. at least first and second switch network means connected to said input means for switching said input signals, each said switch network means including at least two solid state switches, one each of said solid state switches operating to switch one each of said input signals,
- c. at least first and second switches operatively connected to said first and second switch network means, respectively, said first switch operating to switch the signals at the output of said first switch network means and said second switch operating to switch the signals at the output of said second switch network means, said first switch operatively connected to each said solid state switch in said first switch network means and said second switch operatively connected to each said solid state switch in said second switch network means,
- d. an operational amplifier for presenting output signals from said switches, said operational amplifier having input and output terminals said first and second switches operatively connected to said input terminal,
- e. current source means for providing a feedback signal which controls the switching time of each said solid state switch and said first and second switches, said current source means serially connected between said output terminal and each said solid state switch in said first and second switch network means and said first and second switches, and
- f. programmer means for controlling a state of each said solid state switch in said first and second switch network means and said first and second switches, said programmer means connected to each said solid state switch in said first and second network means and said first and second switches.

2. The device of claim 1 wherein said solid state switches are like switches.

3. The device of claim 2 wherein each of said like switch includes:
- a. input means for receiving one of said input signals,
- b. Output means for presenting one of said input signals at an input of one of said switches,
- c. first solid state switch means connected serially between said input means and said output means,
- d. solid state current source means for controlling a state of said first solid state switch and,
- e. driver means for controlling a state of said solid state current source means.

4. The device of claim 2 wherein said first solid state switch means includes;
- a. a first field effect transistor means connected serially between said input means and said output means, and said current source includes:
- b. a second field effect transistor means having said feedback signal applied thereto for controlling a state of said first field effect transistor means.

5. A device for switching voltage comprising:
- a. input means for receiving an input signal;
- b. output means for presenting said input signal;

c. first field effect transistor means having first source, first drain and first gate means, said first gate means operatively connected to said input means, said first drain means operatively connected to said output means, said first field effect transistor means having ON and OFF switching states;

d. second filed effect transistor means having second source, second drain and second gate means, said second source means operatively connected to said first gate means, said second field effect transistor means having ON and OFF switching states, said first field effect transistor means and said second field effect transistor means having mutually exclusive switching states; and e. driver means operatively connected to said first and second field effect transistor means, said first and second field effect transistor means responsive to said driver means, said ON and OFF states of said first and second field effect transistor means being governed by said driver means, said second field effect transistor means operating to control the switching time of said first field effect transistor.

6. A device for switching voltage comprising:

a. input means for receiving an input signal;

b. output means for presenting said input signal;

c. solid state switch means connected serially between said input and output means, said solid state switch means having ON and OFF switching states;

d. solid state current source means through which a current flows, said solid state current source means connected to said solid state switch means, said solid state current source means having ON and OFF switching states, and solid state switch means and said solid state current source means having mutually exclusive switching states; and e. driver means connected to said solid state switch means and solid state current source means, said solid state switch means and solid state current source means responsive to said driver means, said ON and OFF states of said solid state switch means being governed by said driver means, said solid state current source means operating to control the switching time of said solid state switch means;

f. said solid state switch means including:

i. a field effect transistor having source, drain, and gate means, said drain means connected to said output means;

ii. a resistor serially connected between said source means and input means; and iii. a diode, the cathode of said diode connected to the junction of said resistor and input means, the anode of said diode connected to said gate means, current source means, and driver means.

7. The device as claimed in claim 6 wherein said current source means includes:

a. a field effect transistor having source, drain, and gate means, said drain means of said solid state current source defining a feedback input which operates to receive said current; and b. a resistor serially connected between said gate means of said solid state switch means field effect transistor and said source means of said solid state current source means field effect transistor, said gate means of said solid state current source field effect transistor connected to said driver means and said gate means of said solid state switch means field effect transistor.

8. A device for switching voltage comprising:

a. input means for receiving an input signal;

b. output means for presenting said input signal;

c. a first field effect transistor serially connected between said input and output means, said first field effect transistor having ON and OFF states, said first field effect transistor means defining switching means:

d. a second field effect transistor through which a current flows, said second field effect transistor having ON and OFF states, said first and second field effect transistors having mutually exclusive states, said second field effect transistor means defining current source means; and e. driver means connected to said first and second field effect transistors, said ON and OFF states of said first and second field effect transistors being governed by said driver means, said second field effect transistor operating to control the switching time of said first field effect transistor.

9. A multiplexing device for switching voltages comprising:

a. input means operating to receive a plurality of input signals;

b. a plurality switch means connected to said input means, one of said switch means operating to switch one of said input signals, each said switch means including a pair of field effect transistors and a driver, each said field effect transistor having source, drain, and gate electrodes, each said driver having input and output terminals, the drain electrode of the first field effect transistor of said pair connected to said input means, the gate electrode of the first and second field effect transistor connected to the output terminal of said driver, the source electrode of the second field effect transistor resistively connected to the output terminal of said driver;

c. an operational amplifier having input and output terminals, the source electrode of the first field effect transistor of each pair connected to a common junction at the input terminal of said operational amplifier, the output terminal of said operational amplifier connected to the drain electrode of the second field effect transistor of each pair, a current flowing through the second field effect transistor of each pair for controlling the switching time of the first field effect transistor of that pair, said driver controlling the conducting state of each said pair, the first and second field effect transistor of each pair having mutually exclusive conducting states; and d. programmer means connected to the input terminal of each said driver for selectively switching the signals at said input means to the output terminal of said operational amplifier, said driver controlling the conduction states of the field effect transistors of each pair in response to signal generated by said programmer means.

10. The device as claimed in claim 9 wherein each said driver includes:

a. a first resistor;

b. a first transistor having emitter, base, and collector electrodes, said first resistor serially connected between the input terminal of said driver and the emitter electrode of said first transistor, the base electrode of said transistor connected to ground;

c. a second resistor;

d. a second transistor having emitter, base, and collector electrodes, said second resistor serially connected between the base and emitter electrodes of said second transistor, a negative potential being applied to the junction of said second resistor and emitter electrode of said second transistor, the collector electrode of said first transistor connected to the base electrode of said second transistor; and e. a diode serially connected between the collector of said second transistor and the output terminal of said driver, the cathode of said diode being connected to the collector of said second transistor.

11. The device as claimed in claim 10 wherein said first transistor is an PNP-transistor and said second transistor is an NPN-transistor.

* * * * *